United States Patent
Hajimiri et al.

(10) Patent No.: US 11,843,260 B2
(45) Date of Patent: Dec. 12, 2023

(54) GENERATOR UNIT FOR WIRELESS POWER TRANSFER

(71) Applicant: California Institute of Technology, Pasadena, CA (US)

(72) Inventors: Seyed Ali Hajimiri, La Canada, CA (US); Florian Bohn, Pasadena, CA (US); Behrooz Abiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/498,656

(22) Filed: Oct. 11, 2021

(65) Prior Publication Data

US 2022/0278559 A1 Sep. 1, 2022

Related U.S. Application Data

(63) Continuation of application No. 16/143,332, filed on Sep. 26, 2018, now Pat. No. 11,146,113, which is a
(Continued)

(51) Int. Cl.
*H02J 50/20* (2016.01)
*H02J 50/40* (2016.01)
(Continued)

(52) U.S. Cl.
CPC .......... *H02J 50/20* (2016.02); *H01Q 21/225* (2013.01); *H02J 50/23* (2016.02); *H02J 50/40* (2016.02);
(Continued)

(58) Field of Classification Search
CPC .. H02J 50/20; H02J 50/80; H02J 50/90; H02J 50/23; H02J 50/40; H02J 50/60; H02J 7/025; H01Q 21/225
See application file for complete search history.

(56) References Cited

U.S. PATENT DOCUMENTS

| 1,119,732 A | 12/1914 | Tesla |
| 5,400,037 A | 3/1995 | East |

(Continued)

FOREIGN PATENT DOCUMENTS

| CN | 101162267 A | 4/2008 |
| CN | 101309639 A | 11/2008 |

(Continued)

OTHER PUBLICATIONS

Baarman, "Making Wireless Truly Wireless: The need for a universal Wireless Power Solution," Wireless Power Consortium, (Sep. 2009). [Retrieved from the Internet Jan. 9, 2017: https://www.wirelesspowerconsortium.com/technology/making-wireless-truly-wireless.html.

(Continued)

*Primary Examiner* — Carlos Amaya
(74) *Attorney, Agent, or Firm* — Weaver Austin Villeneuve & Sampson LLP

(57) ABSTRACT

An RF signal generator wirelessly transferring power to a wireless device includes, in part, a multitude of generating elements generating a multitude of RF signals transmitted by a multitude of antennas, a wireless signal receiver, and a control unit controlling the phases and/or amplitudes of the RF signals in accordance with a signal received by the receiver. The signal received by the receiver includes, in part, information representative of the amount of RF power the first wireless device receives. The RF signal generator further includes, in part, a detector detecting an RF signal caused by scattering or reflection of the RF signal transmitted by the antennas. The control unit further controls the phase and/or amplitude of the RF signals in accordance with the signal detected by the detector.

30 Claims, 9 Drawing Sheets

Related U.S. Application Data continuation of application No. 14/552,414, filed on Nov. 24, 2014, now Pat. No. 10,320,242, which is a continuation of application No. 14/078,489, filed on Nov. 12, 2013, now Pat. No. 10,367,380.

(60) Provisional application No. 61/920,723, filed on Dec. 24, 2013, provisional application No. 61/908,018, filed on Nov. 22, 2013, provisional application No. 61/724,638, filed on Nov. 9, 2012.

(51) Int. Cl.
*H02J 50/80* (2016.01)
*H02J 50/60* (2016.01)
*H02J 50/90* (2016.01)
*H02J 50/23* (2016.01)
*H01Q 21/22* (2006.01)

(52) U.S. Cl.
CPC .............. *H02J 50/60* (2016.02); *H02J 50/80* (2016.02); *H02J 50/90* (2016.02)

(56) References Cited

U.S. PATENT DOCUMENTS

| | | | |
|---|---|---|---|
| 6,127,799 A | 10/2000 | Krishnan | |
| 6,184,651 B1 | 2/2001 | Fernandez et al. | |
| 6,208,287 B1 | 3/2001 | Sikina et al. | |
| 6,404,268 B1 | 6/2002 | Hung et al. | |
| 6,664,770 B1 | 12/2003 | Bartels | |
| 6,946,950 B1 | 9/2005 | Ueno et al. | |
| 6,967,462 B1 | 11/2005 | Landis | |
| 7,027,311 B2 | 4/2006 | Vanderelli et al. | |
| 7,084,811 B1 | 8/2006 | Yap | |
| 7,212,414 B2 | 5/2007 | Baarman | |
| 7,356,952 B2 | 4/2008 | Sweeney et al. | |
| 7,522,878 B2 | 4/2009 | Baarman | |
| 7,554,316 B2 | 6/2009 | Stevens et al. | |
| 7,868,482 B2 | 1/2011 | Greene et al. | |
| 8,004,235 B2 | 8/2011 | Baarman et al. | |
| 8,284,055 B2 | 10/2012 | Butler et al. | |
| 8,396,173 B2 | 3/2013 | Ling et al. | |
| 8,829,972 B2 | 9/2014 | Nakaie et al. | |
| 9,030,161 B2 | 5/2015 | Lu et al. | |
| 9,124,125 B2 | 9/2015 | Leabman et al. | |
| 9,130,397 B2 | 9/2015 | Leabman et al. | |
| 9,130,602 B2 | 9/2015 | Cook et al. | |
| 9,154,002 B2 | 10/2015 | Norconk et al. | |
| 9,173,178 B2 | 10/2015 | Chakraborty et al. | |
| 9,252,846 B2 | 2/2016 | Lee et al. | |
| 9,601,267 B2 | 3/2017 | Widmer et al. | |
| 9,735,605 B2 | 8/2017 | Garcia et al. | |
| 9,772,401 B2 | 9/2017 | Widmer et al. | |
| 9,983,243 B2 | 5/2018 | Lafontaine et al. | |
| 10,003,278 B2 | 6/2018 | Hajimiri et al. | |
| 10,033,230 B2 | 7/2018 | Sindia et al. | |
| 10,090,714 B2 | 10/2018 | Bohn et al. | |
| 10,320,242 B2 * | 6/2019 | Hajimiri | H02J 50/80 |
| 10,367,380 B2 | 7/2019 | Sengupta et al. | |
| 10,673,351 B2 | 6/2020 | Hajimiri et al. | |
| 10,720,797 B2 | 7/2020 | Hajimiri et al. | |
| 11,095,164 B2 | 8/2021 | Bohn et al. | |
| 11,146,113 B2 * | 10/2021 | Hajimiri | H02J 50/80 |
| 11,502,552 B2 | 11/2022 | Sengupta et al. | |
| 11,616,401 B2 | 3/2023 | Sengupta et al. | |
| 11,616,402 B2 | 3/2023 | Sengupta et al. | |
| 11,616,520 B2 | 3/2023 | Hajimiri et al. | |
| 2002/0030527 A1 | 3/2002 | Hung et al. | |
| 2002/0090966 A1 | 7/2002 | Hansen et al. | |
| 2004/0005863 A1 | 1/2004 | Carrender | |
| 2004/0266338 A1 | 12/2004 | Rowitch | |
| 2006/0121869 A1 | 6/2006 | Natarajan et al. | |
| 2006/0205381 A1 | 9/2006 | Beart et al. | |
| 2006/0287596 A1 | 12/2006 | Johnson et al. | |
| 2007/0178945 A1 | 8/2007 | Cook et al. | |
| 2007/0182367 A1 | 8/2007 | Partovi | |
| 2008/0014897 A1 | 1/2008 | Cook et al. | |
| 2008/0116847 A1 | 5/2008 | Loke et al. | |
| 2008/0227478 A1 | 9/2008 | Greene et al. | |
| 2008/0309452 A1 | 12/2008 | Zeine | |
| 2009/0011734 A1 | 1/2009 | Mertens et al. | |
| 2009/0143065 A1 | 6/2009 | Mattila | |
| 2009/0261779 A1 | 10/2009 | Zyren | |
| 2010/0033021 A1 | 2/2010 | Bennett | |
| 2010/0034238 A1 | 2/2010 | Bennett | |
| 2010/0048255 A1 | 2/2010 | Jojivet et al. | |
| 2010/0142509 A1 | 6/2010 | Zhu et al. | |
| 2010/0181961 A1 | 7/2010 | Novak et al. | |
| 2010/0208848 A1 | 8/2010 | Zhu et al. | |
| 2010/0214159 A1 | 8/2010 | Ookawa et al. | |
| 2010/0231380 A1 | 9/2010 | Liu | |
| 2010/0231382 A1 | 9/2010 | Tayrani et al. | |
| 2010/0259447 A1 | 10/2010 | Crouch | |
| 2010/0277003 A1 | 11/2010 | Von Novak et al. | |
| 2010/0309078 A1 | 12/2010 | Rofougaran et al. | |
| 2010/0315045 A1 | 12/2010 | Zeine | |
| 2010/0323616 A1 | 12/2010 | Von Novak et al. | |
| 2011/0025133 A1 | 2/2011 | Sauerlaender et al. | |
| 2011/0050166 A1 | 3/2011 | Cook et al. | |
| 2011/0053500 A1 | 3/2011 | Menegoli et al. | |
| 2011/0124310 A1 | 5/2011 | Theilmann et al. | |
| 2011/0127848 A1 | 6/2011 | Ryu et al. | |
| 2011/0151789 A1 | 6/2011 | Viglione et al. | |
| 2011/0156640 A1 | 6/2011 | Moshfeghi | |
| 2011/0167291 A1 | 7/2011 | Liu et al. | |
| 2011/0181237 A1 | 7/2011 | Hamedi-Hagh et al. | |
| 2011/0218014 A1 | 9/2011 | Abu-Qahouq | |
| 2012/0091799 A1 | 4/2012 | Rofougaran et al. | |
| 2012/0126636 A1 | 5/2012 | Atsumi | |
| 2012/0217111 A1 | 8/2012 | Boys et al. | |
| 2012/0294054 A1 | 11/2012 | Kim et al. | |
| 2012/0306284 A1 | 12/2012 | Lee et al. | |
| 2012/0326660 A1 | 12/2012 | Lu et al. | |
| 2013/0062959 A1 | 3/2013 | Lee et al. | |
| 2013/0082651 A1 | 4/2013 | Park et al. | |
| 2013/0099584 A1 | 4/2013 | Von Novak, III | |
| 2013/0137455 A1 | 5/2013 | Xia et al. | |
| 2013/0169348 A1 | 7/2013 | Shi | |
| 2013/0201003 A1 | 8/2013 | Sabesan et al. | |
| 2013/0210477 A1 | 8/2013 | Peter | |
| 2013/0249682 A1 | 9/2013 | Van Wiemeersch et al. | |
| 2013/0343106 A1 | 12/2013 | Perreault et al. | |
| 2014/0008993 A1 | 1/2014 | Leabman | |
| 2014/0015344 A1 | 1/2014 | Mohamadi | |
| 2014/0112409 A1 | 4/2014 | Takei | |
| 2014/0175893 A1 | 6/2014 | Sengupta et al. | |
| 2014/0203768 A1 | 7/2014 | Andic et al. | |
| 2014/0333256 A1 | 11/2014 | Widmer et al. | |
| 2015/0015194 A1 | 1/2015 | Leabman et al. | |
| 2015/0022147 A1 | 1/2015 | Jung | |
| 2015/0130293 A1 | 5/2015 | Hajimiri et al. | |
| 2015/0144701 A1 | 5/2015 | Xian et al. | |
| 2015/0145350 A1 | 5/2015 | Hajimiri et al. | |
| 2015/0155739 A1 | 6/2015 | Walley et al. | |
| 2015/0372541 A1 | 12/2015 | Guo et al. | |
| 2016/0094091 A1 | 3/2016 | Shin et al. | |
| 2016/0134150 A1 | 5/2016 | Chen et al. | |
| 2016/0181873 A1 | 6/2016 | Mitcheson et al. | |
| 2016/0190872 A1 | 6/2016 | Bohn et al. | |
| 2016/0285481 A1 | 9/2016 | Cohen | |
| 2016/0380439 A1 | 12/2016 | Shao et al. | |
| 2017/0111073 A1 | 4/2017 | Hajimiri et al. | |
| 2017/0237469 A1 | 8/2017 | Taghivand et al. | |
| 2018/0226841 A1 | 8/2018 | Sengupta et al. | |
| 2018/0233963 A1 | 8/2018 | Sengupta et al. | |
| 2018/0233964 A1 | 8/2018 | Sengupta et al. | |
| 2019/0006888 A1 | 1/2019 | Hajimiri et al. | |
| 2019/0044390 A1 | 2/2019 | Hajimiri et al. | |
| 2019/0245389 A1 | 8/2019 | Johnston et al. | |
| 2019/0260237 A1 | 8/2019 | Bohn et al. | |

(56) References Cited

U.S. PATENT DOCUMENTS

| | | | |
|---|---|---|---|
| 2020/0083752 | A1 | 3/2020 | Bohn et al. |
| 2023/0142689 | A1 | 5/2023 | Hajimiri et al. |

FOREIGN PATENT DOCUMENTS

| | | | |
|---|---|---|---|
| CN | 101978746 A | 2/2011 | |
| CN | 102089952 A | 6/2011 | |
| CN | 102640394 A | 8/2012 | |
| CN | 103155353 A | 6/2013 | |
| CN | 103748764 A | 4/2014 | |
| CN | 103763720 A | 4/2014 | |
| CN | 103782521 A | 5/2014 | |
| CN | 103843221 A | 6/2014 | |
| CN | 104885333 A | 9/2015 | |
| EP | 2858209 A1 | 4/2015 | |
| JP | 2008178196 A | 7/2008 | |
| JP | 2008245404 A | 10/2008 | |
| JP | 2011199975 A | 10/2011 | |
| JP | 2013005529 A | 1/2013 | |
| JP | 2013538548 A | 10/2013 | |
| KR | 20110133242 A | 12/2011 | |
| KR | 20110135507 A | 12/2011 | |
| KR | 20120005484 A | 1/2012 | |
| KR | 20120020809 A | 3/2012 | |
| KR | 20120069496 A | 6/2012 | |
| KR | 20130020721 A | 2/2013 | |
| KR | 20130035905 A | 4/2013 | |
| KR | 20140008021 A | 1/2014 | |
| TW | 201240402 A | 10/2012 | |
| WO | WO-2007084716 A2 | 7/2007 | |
| WO | WO-2010006078 A1 | 1/2010 | |
| WO | WO-2013151259 A1 | 10/2013 | |
| WO | WO-2014075103 A1 | 5/2014 | |
| WO | WO-2014075109 A1 | 5/2014 | |
| WO | WO-2015077726 A1 | 5/2015 | |
| WO | WO-2015077730 A1 | 5/2015 | |
| WO | WO-2016028939 A1 | 2/2016 | |
| WO | WO-2017053631 A1 | 3/2017 | |

OTHER PUBLICATIONS

CN Office Action dated Apr. 10, 2020, in CN Application No. 2016800650632.
CN Office Action dated Jul. 26, 2017, in CN Application No. 201380069301.3.
CN Office Action dated Jul. 30, 2018, in CN Application No. 2015800438663.
CN Office Action dated Jun. 19, 2019, in CN Application No. 2015800438663.
CN Office Action dated May 24, 2019, in CN Application No. 2016800650632.
CN Office Action dated Oct. 31, 2017, in CN Application No. 201480063373.1.
CN Office Action dated Sep. 29, 2016, in CN Application No. 201380069301.3.
CN Office Action dated Sep. 29, 2018, in CN Application No. 201480063373.1.
CN Office Action dated Sep. 5, 2017, in CN Application No. 201480063517.3.
Dickinson, "Evaluation of a Microwave High Power Reception Conversion Array for Wireless Power Transmission," Tech. Memo. 33-41, Jet Propulsion Laboratory, California Institute of Technology, (Sep. 1, 1975). [Retrieved from the Internet Jan. 9, 2017: https://ntrs.nasa.gov/archive/nasa/casi.ntrs.nasa.gov/19760004119.pdf.
Dickinson, "Performance of a High-Power, 2.388-GHz Receiving Array in Wireless Power Transmission Over 1.54 km," Microwave Symposium, 1976, IEEE-MTT-S International, pp. 139-141, IEEE, (1976).
EP Extended Search Report dated Jul. 14, 2017, in EP Application No. 14863147.6.
EP office action dated Dec. 6, 2021, in application No. EP13854148.7.
EP Office Action dated Jun. 8, 2018, in EP Application No. 14863147.6.
EP Office Action dated Mar. 30, 2021 in EP Application No. 16849637.0.
EP Office Action dated May 11, 2022, in Application No. EP16849637.0.
EP Search Report dated Apr. 9, 2019 in EP Application No. 16849637.0.
EP Search Report dated Dec. 21, 2020 in EP Application No. 20199533.9.
EP Search Report dated Jun. 16, 2020, in EP Application No. 13854148.7.
EP Search Report dated May 22, 2018 in EP Application No. 15833852.5.
EP Search Report dated May 26, 2017 in EP Application No. 14863210.2.
EP Supplementary European Search Report for application 13854148 dated Jun. 20, 2016.
Hirai, et al., "Practical Study on Wireless Transmission of Power and Information for Autonomous Decentralized Manufacturing System," IEEE Transactions on Industrial Electronics, 46(2):349-359, (1999).
IPRP dated Feb. 21, 2017 in PCT Application No. PCT/US2015/045969.
IPRP dated Jun. 2, 2016 in PCT Application PCT/US2014/067175.
IPRP dated Mar. 27, 2018 in PCT Application No. PCT/US2016/053202.
IPRP dated May 12, 2015 in PCT Application No. PCT/US2013/069757.
IPRP dated May 24, 2016 in PCT Application No. PCT/US2014/067187.
ISR & WO dated Dec. 9, 2016 in PCT Application No. PCT/US2016/053202.
ISR & WO dated Feb. 25, 2014 in PCT Application No. PCT/US2013/069757.
ISR & WO dated Mar. 16, 2015 in PCT Application No. PCT/US2014/067187.
ISR & WO dated Mar. 16, 2015 in PCT Application PCT/US2014/067175.
ISR & WO dated Oct. 23, 2015 in PCT Application No. PCT/US2015/045969.
Karalis, et al., "Efficient wireless non-radiative mid-range energy transfer," Annals of Physics, 323(2008):34-38, (2008).
Kotani et al., High-Efficiency Differential-Drive CMOS Rectifier for UHF RFIDs, IEEE Journal of Solid-State Circuits, 44(11):3011-3018, (2009).
KR office action dated May 30, 2022 in Application No. KR20217024751 with English translation.
KR Office Action dated Apr. 27, 2022 in Application No. KR1020217022372 with English translation.
KR Office Action dated Jan. 20, 2021 in KR Application No. 10-2016-7015112.
KR Office Action dated Jun. 12, 2020, in KR Application No. KR 10-2015-7014646.
KR Office Action dated May 8, 2021, in KR Application No. 10-2016-7015505.
KR Office Action dated Nov. 12, 2020 in KR Application No. 10-2017-7005942.
KR office action dated Nov. 25, 2021, in application No. KR20217024751 with English translation.
KR Office Action dated Oct. 14, 2019, in KR Application No. KR 10-2015-7014646.
KR Office Action dated Oct. 28, 2021 in Application No. KR1020217022372 with English translation.
Kurs, et al., "Wireless Power Transfer via Strongly Coupled Magnetic Resonances," Science, 371 (83):83-86, (2007).

(56) References Cited

OTHER PUBLICATIONS

Tong, "A Novel Differential Microstrip Patch Antenna and Array at 79 GHz,", Proc. Int.Antennas Propag. Symp., pp. 279-280, (2008). [Retrieved from the Internet Jan. 9, 2017: https://www.researchgate.net/profile/Christoph_Wagner4/publication/228992601_A_novel_differential_microstrip_patch_antenna_and_array_at_79_GHz/links/00b4952930cb62e535000000.pdf.
U.S. Corrected Notice of Allowance dated Oct. 19, 2022 in U.S. Appl. No. 15/273,633.
U.S. Corrected Notice of Allowance dated Oct. 19, 2022 in U.S. Appl. No. 15/942,211.
U.S. Corrected Notice of Allowance dated Oct. 19, 2022 in U.S. Appl. No. 15/952,124.
U.S. Corrected Notice of Allowance dated Oct. 19, 2022 in U.S. Appl. No. 15/952,128.
U.S. Notice of Allowance dated Jul. 8, 2022 in U.S. Appl. No. 15/952,124.
U.S. Appl. No. 14/078,489, Final Office Action dated Feb. 24, 2017.
U.S. Appl. No. 14/078,489, Non-Final Office Action dated May 12, 2016.
U.S. Appl. No. 14/078,489, Response to Final Office Action filed Dec. 3, 2018.
U.S. Appl. No. 14/078,489, Response to Non-Final Office Action filed Mar. 20, 2018.
U.S. Appl. No. 14/078,489, Response to Non-Final Office Action filed Nov. 8, 2016.
U.S. Appl. No. 14/078,489, Supplemental Amendment filed Mar. 27, 2018.
U.S. Appl. No. 14/552,249, Response to Non-Final Office Action filed Jan. 19, 2018.
U.S. Appl. No. 14/552,414, Response to Non-Final Office Action filed Sep. 25, 2017.
U.S. Appl. No. 14/552,414, Response to Non-Final Office Action filed Sep. 26, 2018.
U.S. Appl. No. 14/830,692, Notice of Allowance dated Jun. 14, 2018.
U.S. Appl. No. 14/830,692, Requirement for Restriction/Election dated Jul. 6, 2017.
U.S. Appl. No. 14/830,692, Response to Non-Final Office Action filed Apr. 16, 2018.
U.S. Appl. No. 14/830,692, Response to Requirement for Restriction/Election filed Aug. 15, 2017.
U.S. Appl. No. 15/273,633, Requirement for Restriction/Election dated Mar. 28, 2018.
U.S. Appl. No. 15/273,633, Response to Non-Final Office Action filed Feb. 22, 2019.
U.S. Appl. No. 15/992,089, Non-Final Office Action dated Jun. 7, 2019.
U.S. Appl. No. 15/992,089, Notice of Allowance dated Mar. 23, 2020.
U.S. Appl. No. 16/109,591, Requirement for Restriction/Election dated Mar. 16, 2020.
U.S. Appl. No. 16/109,591, Requirement for Restriction/Election dated Jul. 17, 2019.
U.S. Appl. No. 16/143,332, Final Office Action dated Dec. 26, 2019.
U.S. Appl. No. 14/552,414, Response to Final Office Action filed Jan. 25, 2018.
U.S. Corrected Notice of Allowance dated Apr. 26, 2022, in U.S. Appl. No. 15/942,211.
U.S. Corrected Notice of Allowance dated May 11, 2022, in U.S. Appl. No. 15/952,128.
U.S. Corrected Notice of Allowance dated Nov. 18, 2022 in U.S. Appl. No. 15/273,633.
U.S. Final Office Action dated Jun. 13, 2019, in U.S. Appl. No. 15/273,633.
U.S. Final Office Action dated Mar. 4, 2021, in U.S. Appl. No. 15/273,633.
U.S. Final Office Action dated May 13, 2020, in U.S. Appl. No. 15/942,211.
U.S. Final Office Action dated May 13, 2020, in U.S. Appl. No. 15/952,124.
U.S. Final Office Action dated May 13, 2020, in U.S. Appl. No. 15/952,128.
U.S. Final Office Action dated Oct. 14, 2021, in U.S. Appl. No. 15/942,211.
U.S. Final Office Action dated Oct. 14, 2021, in U.S. Appl. No. 15/952,128.
U.S. Final Office Action dated Oct. 15, 2021, in U.S. Appl. No. 15/952,124.
U.S. Final Office Action dated Oct. 26, 2017, in U.S. Appl. No. 14/552,414.
U.S. Notice of Allowance dated Jul. 7, 2022 in U.S. Appl. No. 15/942,211.
U.S. Notice of Allowance dated Jul. 11, 2022 in U.S. Appl. No. 15/952,128.
U.S. Notice of Allowance dated Apr. 13, 2021, in U.S. Appl. No. 16/143,332.
U.S. Notice of Allowance dated Apr. 30, 2019, in U.S. Appl. No. 14/552,414.
U.S. Notice of Allowance dated Apr. 9, 2021, in U.S. Appl. No. 16/109,591.
U.S. Notice of Allowance dated Feb. 12, 2019, in U.S. Appl. No. 14/552,414.
U.S. Notice of Allowance dated Feb. 22, 2018, in U.S. Appl. No. 14/552,249.
U.S. Notice of Allowance dated Jan. 24, 2020, in U.S. Appl. No. 16/004,198.
U.S. Notice of Allowance dated Jun. 20, 2022 in U.S. Appl. No. 15/273,633.
U.S. Notice of Allowance dated Jun. 3, 2019, in U.S. Appl. No. 14/078,489.
U.S. Notice of Allowance dated Mar. 23, 2022, in U.S. Appl. No. 15/952,128.
U.S. Notice of Allowance dated Mar. 25, 2022, in U.S. Appl. No. 15/942,211.
U.S. Notice of Allowance dated Mar. 28, 2022, in U.S. Appl. No. 15/942,211.
U.S. Notice of Allowance dated May 18, 2018, in U.S. Appl. No. 14/830,692.
U.S. Notice of Allowance dated Oct. 9, 2018, in U.S. Appl. No. 14/552,414.
U.S. Office Action dated Aug. 2, 2017, in U.S. Appl. No. 14/552,249.
U.S. Office Action dated Feb. 19, 2021, in U.S. Appl. No. 15/942,211.
U.S. Office Action dated Feb. 19, 2021, in U.S. Appl. No. 15/952,128.
U.S. Office Action dated Feb. 24, 2021, in U.S. Appl. No. 15/952,124.
U.S. Office Action dated Feb. 25, 2022, in U.S. Appl. No. 15/952,124.
U.S. Office Action dated Jan. 28, 2019, in U.S. Appl. No. 14/078,489.
U.S. Office Action dated Jul. 15, 2019, in U.S. Appl. No. 16/004,198.
U.S. Office Action dated Jul. 26, 2019, in U.S. Appl. No. 16/143,332.
U.S. Office Action dated Jul. 29, 2019, in U.S. Appl. No. 15/942,211.
U.S. Office Action dated Jul. 29, 2019, in U.S. Appl. No. 15/952,124.
U.S. Office Action dated Jul. 29, 2019, in U.S. Appl. No. 15/952,128.
U.S. Office Action dated Jun. 1, 2018, in U.S. Appl. No. 14/078,489.
U.S. Office Action dated Mar. 24, 2017, in U.S. Appl. No. 14/552,414.
U.S. Office Action dated Mar. 26, 2018, in U.S. Appl. No. 14/552,414.
U.S. Office Action dated May 28, 2020, in U.S. Appl. No. 15/273,633.
U.S. Office Action dated Oct. 16, 2017, in U.S. Appl. No. 14/830,692.
U.S. Office Action dated Sep. 14, 2020, in U.S. Appl. No. 16/143,332.
U.S. Office Action dated Sep. 20, 2018, in U.S. Appl. No. 15/273,633.
U.S. Office Action dated Sep. 20, 2021, in U.S. Appl. No. 15/273,633.
U.S. Office Action dated Sep. 22, 2017, in U.S. Appl. No. 14/078,489.
U.S. Office Action dated Sep. 24, 2020, in U.S. Appl. No. 16/109,591.
U.S. Appl. No. 17/986,807, inventors Sengupta et al., filed Nov. 14, 2022.
U.S. Appl. No. 18/093,291, Inventors Hajimiri et al., filed Jan. 4, 2023.
Whitesides, "Researchers Beam 'Space' Solar Power in Hawaii," Wired Magazine, (Sep. 12, 2008). [Retrieved from the Internet Jan. 10, 2017: https://www.wired.com/2008/09/visionary-beams/.
WIPO Application No. PCT/US2018/034947, PCT International Preliminary Report on Patentability dated Nov. 26, 2019.

(56) References Cited

OTHER PUBLICATIONS

WIPO Application No. PCT/US2018/034947, PCT International Search Report and Written Opinion of the International Searching Authority dated Aug. 3, 2018.
Young-Jin Moon et al, "A 3.0-W wireless power receiver circuit with 75-% overall efficiency," 2012 IEEE Asian Solid State Circuits Conference (A-SSUS), Nov. 14, 2012, pp. 97-100.
Zheng, "Introduction to Air-to-air missiles system," Weapon Industry Press, Beijing, pp. 94-95, Dec. 31, 1997.
CN Office Action dated Mar. 30, 2023 in Application No. CN202010099960.3 with English translation.

\* cited by examiner

GENERATOR UNIT FOR WIRELESS POWER TRANSFER

CROSS-REFERENCES TO RELATED APPLICATIONS

This application is a Continuation of Ser. No. 14/552,414, filed Nov. 24, 2014, entitled "GENERATOR UNIT FOR WIRELESS POWER TRANSFER", which claims the benefit under 35 USC 119 (e) of U.S. provisional Application No. 61/908,018, filed Nov. 22, 2013, entitled "GENERATOR UNIT FOR WIRELESS POWER TRANSFER", and U.S. provisional Application No. 61/920,733, filed Dec. 24, 2013, entitled "ARCHITECTURES FOR GENERATION UNITS FOR WIRELESS POWER TRANSFER", the contents of all of which are incorporated herein by reference in their entirety.

The present application is related to and claims the priority benefit of application Ser. No. 14/078,489, filed Nov. 12, 2013, commonly assigned, and entitled "SMART RF LENSING: EFFICIENT, DYNAMIC AND MOBILE WIRELESS POWER TRANSFER", the content of which is incorporated herein by reference in its entirety.

BACKGROUND OF THE INVENTION

Advances in silicon processing have enabled integration of complex systems on a single low power chip. The low cost and low power consumption of such systems have resulted in proliferation of portable electronic devices. To operate, such devices must be frequently plugged into an electrical outlet to be charged.

Wireless power transmission may be achieved using inductive coupling or electromagnetic waves. Inductive coupling can deliver power over a short range. Electromagnetic (EM) waves may be used to transmit power over a longer distance. Both inductive coupling and EM waves cause an alternating current (AC) to be generated at the receiver.

BRIEF SUMMARY OF THE INVENTION

An RF signal generator adapted to wirelessly transfer power to a first wireless device, in accordance with one embodiment of the present invention, includes, in part, a multitude of generating elements adapted to generate a multitude of RF signals transmitted by a multitude of antennas, a wireless signal receiver, and a control unit adapted to control the phases of the RF signals generated by the generating elements in accordance with a signal received by the receiver. The signal received by the receiver includes, in part, information representative of the amount of RF power the first wireless device receives from the RF signal generator.

In one embodiment, the control unit is further adapted to control the amplitude of the RF signals generated by the generating elements. In one embodiment, the RF signal generator is adapted to wirelessly transfer power to the first wireless device using time-domain multiplexing. In one embodiment In one embodiment, the RF signal generator is further adapted to power a second wireless device concurrently with the first wireless device. In one embodiment, the RF generator is adapted to power the first and second wireless devices using time-domain multiplexing.

In one embodiment, the RF signal generator further includes, in part, a second multitude of generating elements each adapted to generate an RF signal. The control unit is further adapted to cause either the first multitude of generating elements or the second multitude of generating elements to generate RF signals during a given time period. In one embodiment, each of the first and second multitude of generating elements generates an RF signal in accordance with a reference timing signal supplied by the control unit.

In one embodiment, the RF signal generator further includes, in part, a detector adapted to detect an RF signal caused by scattering or reflection of the RF signal transmitted by the first multitude of antennas. In one embodiment, the control unit is further adapted to control a phase or amplitude of the RF signal generated by each of the first multitude of RF signal generating elements in accordance with the signal detected by the detector. In one embodiment, the detector is further adapted to detect the presence of objects or living organisms positioned along the path of the RF signal transmitted by the first multitude of antennas.

In one embodiment, the RF signal generator is integrated on a semiconductor substrate. In one embodiment, the RF signal generator is adapted to receive the second multitude of generating elements in a modular fashion to enable the control unit control the phase or amplitude of the RF signal generated by each of the second multitude of RF signal generating elements in accordance with the signal the receiver receives from the first wireless device. In one embodiment, the RF signal generator further includes, in part, a multitude of control locked loops adapted to provide timing signals used in varying the phases of the RF signals generated by the RF signal generating elements. In one embodiment, the RF signal generator further includes, in part, a multitude of phase rotators adapted to vary the phases of the RF signals generated by the RF signal generating elements. In one embodiment, the reference timing signal is delivered to the first and second multitude of generating elements via a tree-like distribution network.

A method of powering a first wireless device using radio frequency (RF) signals, in accordance with one embodiment of the present invention, includes, in part, transmitting a first multitude of RF signals via a first plurality of antennas, receiving a signal from the first wireless device, and controlling the phases of the first multitude of RF signals in accordance with the signal received from the first wireless device. The signal received from the first wireless device includes information representative of an amount of RF power the first wireless device receives.

The method, in accordance with one embodiment, further includes, in part, controlling the amplitudes of the RF signals transmitted by the first multitude of antennas in accordance with the signal received from the first wireless device. The method, in accordance with one embodiment, further includes, in part, transmitting the first multitude of RF signals using time-domain multiplexing. The method, in accordance with one embodiment, further includes, in part, transmitting a second multitude of RF signals to power a second wireless device concurrently with the first wireless device. The method, in accordance with one embodiment, further includes, in part, transmitting the first and second multitude of RF signals in accordance with a reference timing signal supplied by a control unit.

The method, in accordance with one embodiment, further includes, in part, detecting a scattered RF signal caused by scattering or reflection of the RF signal transmitted by the first multitude of antennas. The method, in accordance with one embodiment, further includes, in part, controlling the phases of the first multitude of RF signals in accordance with the detected RF signal. The method, in accordance with one embodiment, further includes, in part, detecting the presence of objects or living organisms positioned along the path of the first multitude of RF signals.

The method, in accordance with one embodiment, further includes, in part, generating the first multitude of RF signals via a first multitude of generating elements formed on a semiconductor substrate. The semiconductor substrate further including, a receiving unit receiving the signal from the first wireless device, and a controller controlling the phases of the first multitude of RF signals. The method, in accordance with one embodiment, further includes, in part, generating the first multitude of RF signals via a first multitude of generating elements disposed in a generating unit adapted to receive a second multitude of generating elements in a modular fashion. The second multitude of generating elements generating the second multitude of RF signals.

The method, in accordance with one embodiment, further includes, in part, controlling the phases of the first multitude of RF signals in accordance with a timing signal generated by one or more control locked loops. The method, in accordance with one embodiment, further includes, in part, controlling the phases of the first multitude of RF signals using a multitude of phase rotators. The method, in accordance with one embodiment, further includes, in part controlling the phases of the first and second multitude of RF signals using timing signals delivered via a tree-like distribution network.

DETAILED DESCRIPTION OF THE INVENTION

In accordance with embodiments of the present invention, power is adaptively transferred wirelessly from one or more sources of electromagnetic waves (also referred to herein as generation units) to one or more receive units (also referred to herein as recovery units or devices) adapted to convert the received radio-frequencies (RF) EM power to a direct current (DC) electrical power. Such devices include, for example, cell phones, tablet computers, electrical toothbrushes, computer mice, security cameras, smoke alarms, measurement equipment in hazardous areas, robots, and the like. Embodiments of the present invention transfer power over short or medium ranges in a multitude of configurations, as described further below.

A generation unit, in accordance with one aspect of the present invention, is reconfigurable and adaptive to enable the RF power to be localized in space to maximize power transmission from the generation unit to the receive unit, and minimize RF power loss through radiation. This enables the receive unit to be physically relatively small without affecting the transfer efficiency.

Because a generation unit, in accordance with embodiments of the present invention, may be adaptively controlled to vary the path(s) for the RF power transfer, localization of wireless power transfer is achieved even in the presence of multi-path effects. The generation unit may be further adapted to track the receive unit and account for reflections off the obstacles in the surrounding environment.

Figure 1:
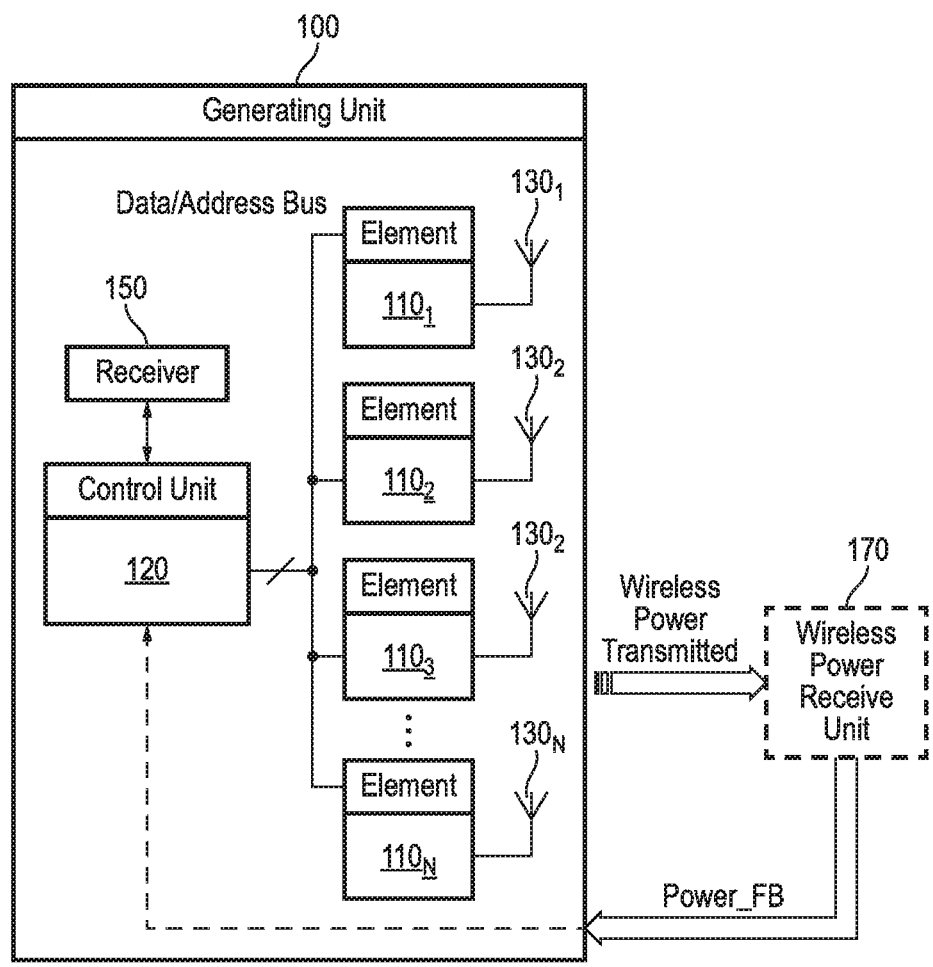
FIG. 1 is a block diagram of a generation unit adapted to wirelessly transfer power to a receive unit via radio frequency (RF) electro-magnetic waves, in accordance with one exemplary embodiment of the present invention.

FIG. 1 is a block diagram of a generation unit (GU) 100 adapted to wirelessly transfer power to a receive unit 170 via radio frequency (RF) electro-magnetic (EM) waves, in accordance with one exemplary embodiment of the present invention. GU 100 is shown as including a control unit 120, a receiver 150, and a multitude of power generating elements $110_1, 110_2, 110_3, 110_4 \ldots 110_N$, where N is an integer greater than one. Control unit 120 is configured to control the operations of the generating elements. For example, in one embodiment, control unit 120 controls the phase and/or amplitude of the RF signal generated by each generating element $110_i$ independently, where i is an integer ranging from 1 to N. Control unit 120 is also adapted to perform other functions such as optimization of the wireless power transfer.

Each generating element $110_i$ (also referred to as generating element 110) is shown as being coupled to an antenna $130_i$. By adjusting the phase and/or amplitude of the RF signal generated by each generating elements $110_i$ independently, control unit 120 causes GU 100 to deliver the RF power in an optimum way, as described below and in application Ser. No. 14/078,489, which is incorporated herein by reference in its entirety. In one embodiment, GU 100 is integrated on a semiconductor substrate. Although in FIG. 1 each generating element 110 is shown as being associated with an antenna, it is understood that in other embodiments a multitude of generating elements 110 may share the same antenna with each generating element 110 driving the shared antenna along a predefined polarization direction. Although in FIG. 1 each generating element 110 is shown as being associated with a single antenna, it is understood that in other embodiments a generating element 110 may be associated with a multitude of antennas.

Figure 2:
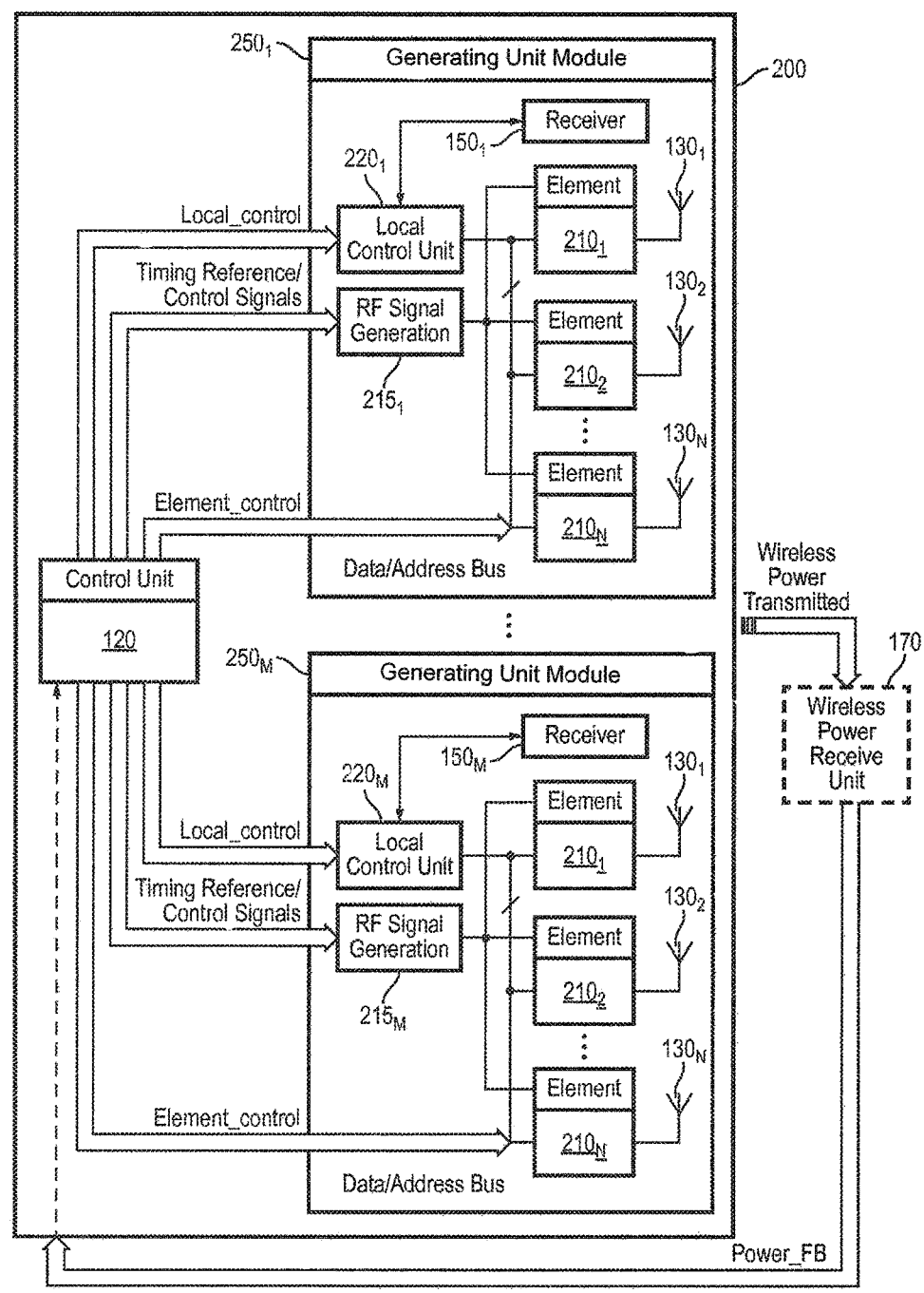
FIG. 2 is a block diagram of a generation unit adapted to wirelessly transfer power to a receive unit via RF electromagnetic waves, in accordance with another exemplary embodiment of the present invention.

FIG. 2 is a block diagram of a GU 200 adapted to wirelessly transfer power, in accordance with another exemplary embodiment of the present invention. GU 200 is shown as including a control unit 120 and a multitude of power generating unit modules $250_1 \ldots 250_M$, where M is an integer greater than one. Each generating unit module $250_i$ is shown as including a multitude of generating elements $210_1, 210_2 \ldots 210_N$ where N is an integer greater than one. Each generating unit module $250_i$ is also shown as including an RF signal generation circuit $215_j$ wherein j is an integer ranging from 1 to M, a receiver $150_j$ and an optional local control unit $220_j$. Although in FIG. 2 each generating element $210_i$ (also referred to as generating element 210) is shown as being coupled to an associated antenna, it is understood that in other embodiments, a multitude of generating elements 210 may share the same antenna with each generating element 210 driving the shared antenna along a predefined polarization direction. Although in FIG. 2 each generating element 210 is shown being as associated with a single antenna, it is understood that in other embodiments a generating element 210 may be associated with a multitude of antennas.

Control unit 120, which is a master control unit, is adapted to control and vary the phase and/or amplitude of the RF signal generated by each generating element $210_i$ of each generating unit module $250_j$ independently via control signal Element_control. Each local control unit $220_j$ is adapted to control the operations of generating elements $210_1, 210_2 \ldots 210_N$ disposed in that generating unit module in response to signal Local_control generated by control unit 210. For example, in one embodiment, further optimization of the phase/amplitude of the RF signal generated by the generating elements $210_i$ disposed in a generation unit module (e.g., generation unit module $250_1$) is controlled by the associated local control unit $220_j$ also disposed in that generating unit module (e.g., local control unit 2201). RF signal generation block $215_j$ of each generating unit module 250, supplies a reference timing signal to generating elements $210_1, 210_2 \ldots 210_N$ disposed in that generating unit in response to a timing signal supplied by control unit 120. In one embodiment, as described further below, each RF signal generation block $215_j$ may be a frequency/phase locked-loop, delay locked-loop or any other control locked-loop or tunable delay circuit that generates a reference timing signal.

In some embodiments, many of the operations common to generating elements $210_1, 210_2 \ldots 210_N$ of each generation unit module $250_j$ are performed, in part, in response to commands/data issued by the generating unit's associated local control unit $220_j$. Accordingly, each generating elements $210_1, 210_2 \ldots 210_N$ of each generation unit $250_j$ may be independently controlled either by the local control unit $220_j$, or control unit 120 common to all generation units $250_j$.

In accordance with one aspect of the present invention, by independently controlling the phase and/or amplitude of the RF signal generated by each generating element $210_1, 210_2 \ldots 210_N$ (alternatively and collectively referred to as generating element 210) of each generating unit module $250_j$, the RF power transferred to a receive unit 170 may be maximized.

To achieve such maximization, receive unit 170 transmits a signal to the GU which includes information about the amount of power the receive unit is receiving from the GU. The signal transmitted by the receive unit is received by receiver 150 disposed in the GU or in the generating unit modules disposed in the GU. For example, in one embodiment, as shown in FIGS. 1 and 2, to maintain the optimum power transfer as the receive unit moves within the range covered by the GU, the receive unit broadcasts a signal Power_FB that includes a unique identifier assigned to the receive unit as well as information indicative of the amount of power the receive unit is receiving. The signal transmitted by the receive unit may further inform the generating unit that the receiver is in the vicinity of the generating unit and is ready to receive power. The signal transmitted by the receive unit may further identify the receive unit's device type, such as a robot, a mouse, and the like. As described further below, the wireless communications between the receive and generating units may be performed in accordance with any of communications protocols.

The GU receives and uses the information in signal Power_FB to adaptively change the phase and/or amplitude of the RF signals transmitted by the generating elements 210 to maintain and/or maximize the power transfer and/or the transfer efficiency to the receive unit. Many conventional algorithms such as the Nelder-Mead, gradient descent, Newton-Raphson, may be used to achieve such optimization.

When powering a single receive unit, and assuming that each generating element 210 has a constant impedance, adaptive control of the control unit 120 may be performed in accordance with a quadratic program with a global optimum solution. A number of well-known solutions exist to such quadratic programs.

For broadcasting information about the received power, a receive unit may use any wireless communication protocol, either in existence today or developed in the future. For example, in one embodiment, an IEEE 802.11 wireless local area network (WLAN) standard may be used by a receive unit to send a signal to the GU to indicate the power the receive unit is receiving from the GU. In other embodiments, such communication may be performed using, for example, the Bluetooth, Zigbee, and the like. In yet other embodiments, a GU may operate as a WLAN server to select a receiving element from among a multitude of receiving elements to establish communications with. Communication between the GUs to coordinate their operations may also be handled via a two-way wireless communications network. Such communication links may also be used by the receive unit to broadcast the receive unit's ID, and to inform the GUs that the receiver is ready to receive power. The signal identifying the receive unit's device type, as well as any other communications between the receive unit and the GU(s) may also be carried out using such communications links.

Figure 3:
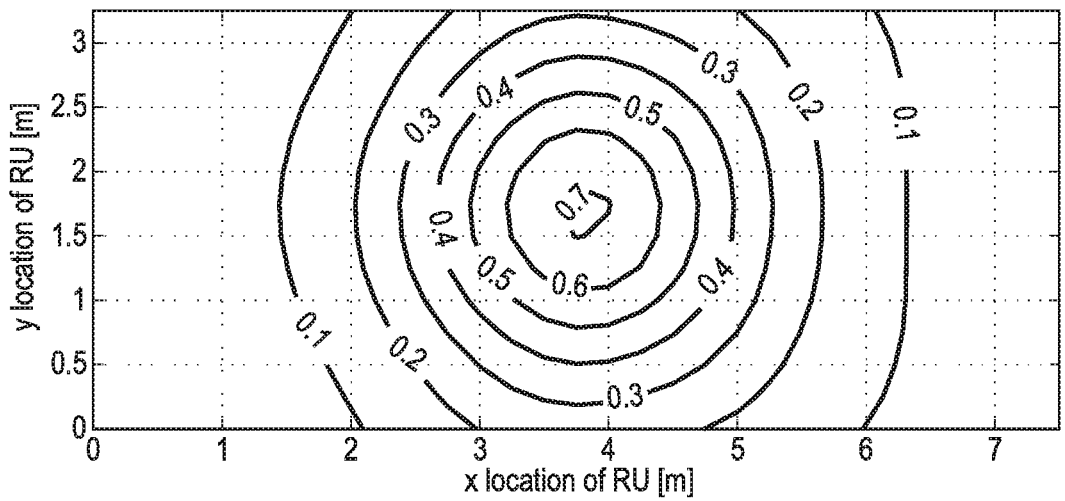
FIG. 3 is an exemplary computer simulation of the power transmission efficiency of an RF power generator.

In some embodiment, depending on their physical arrangements and positions with respect to one another, the generation unit modules may be caused to transmit power sequentially. In some embodiment, when no receive unit is detected, the GU is caused to enter a power savings mode during which no RF signal is transmitted by the GU. FIG. 3 is an exemplary simulation of the power transmission efficiency of an RF signal as received by an array of 5×3 receive units along different positions in the x-y plane. The RF signal generator was simulated to include an array of 27×43 generating units positioned 2 meters above the receive unit. As is seen from FIG. 3, for example, when the generating units were simulated to be directly above the receive unit (at the x and y coordinates of 3.8 and 1.7 meters respectively), the power efficiency is shown to be 0.7.

The amount of RF power generated by a GU may be controlled to optimize transfer efficiency, meet the power requirements of the receiving element(s), and/or limit the power reflected off transient objects and/or living organisms that may be in the path of the transmitted RF signal, as described further below. Furthermore, in accordance with one aspect of the present invention, a time-multiplexed technique (time-domain multiplexing) is used to transfer power from a GU to one or more receive units. In accordance with this technique, when powering a single receive unit, the GU is controlled so as to generate and transmit power during certain time periods and not generate power during other periods. Accordingly, the average power transferred is controlled by the switching duty cycle of the RF power generated by the GU.

Figure 4:
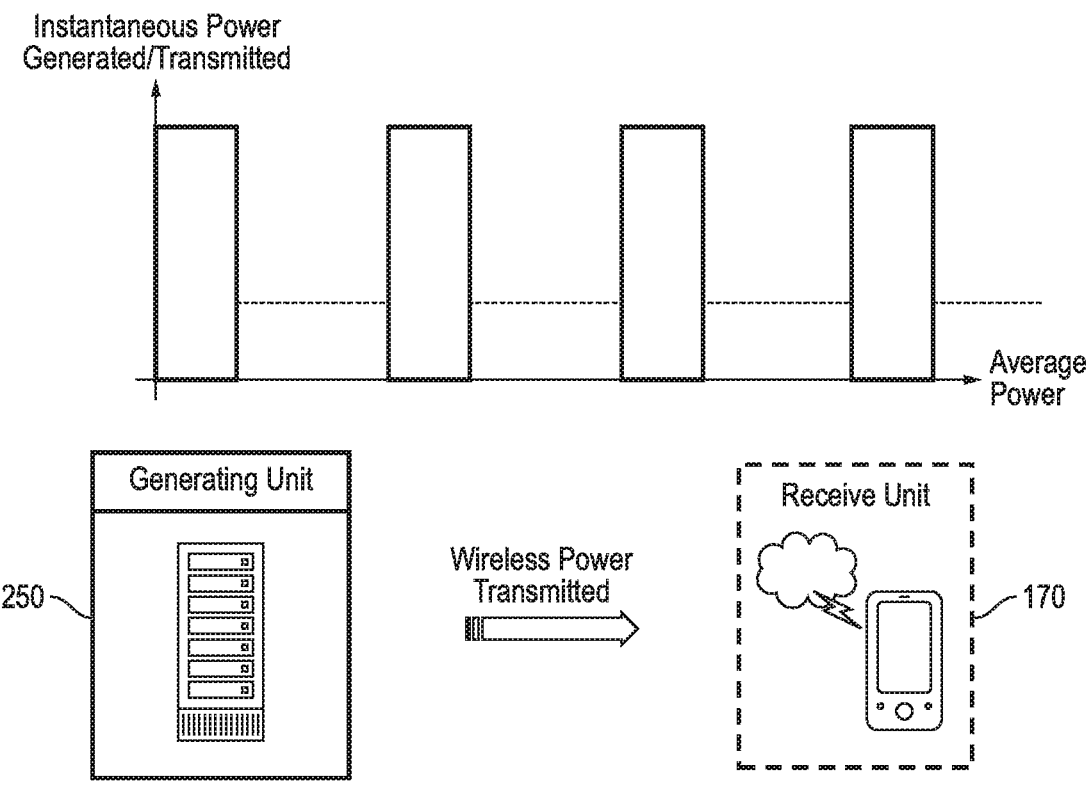
FIG. 4 is an exemplary timing diagram of cycles during which power is transferred from a generating unit to a receive unit, in accordance with one exemplary embodiment of the present invention.
Figure 5:
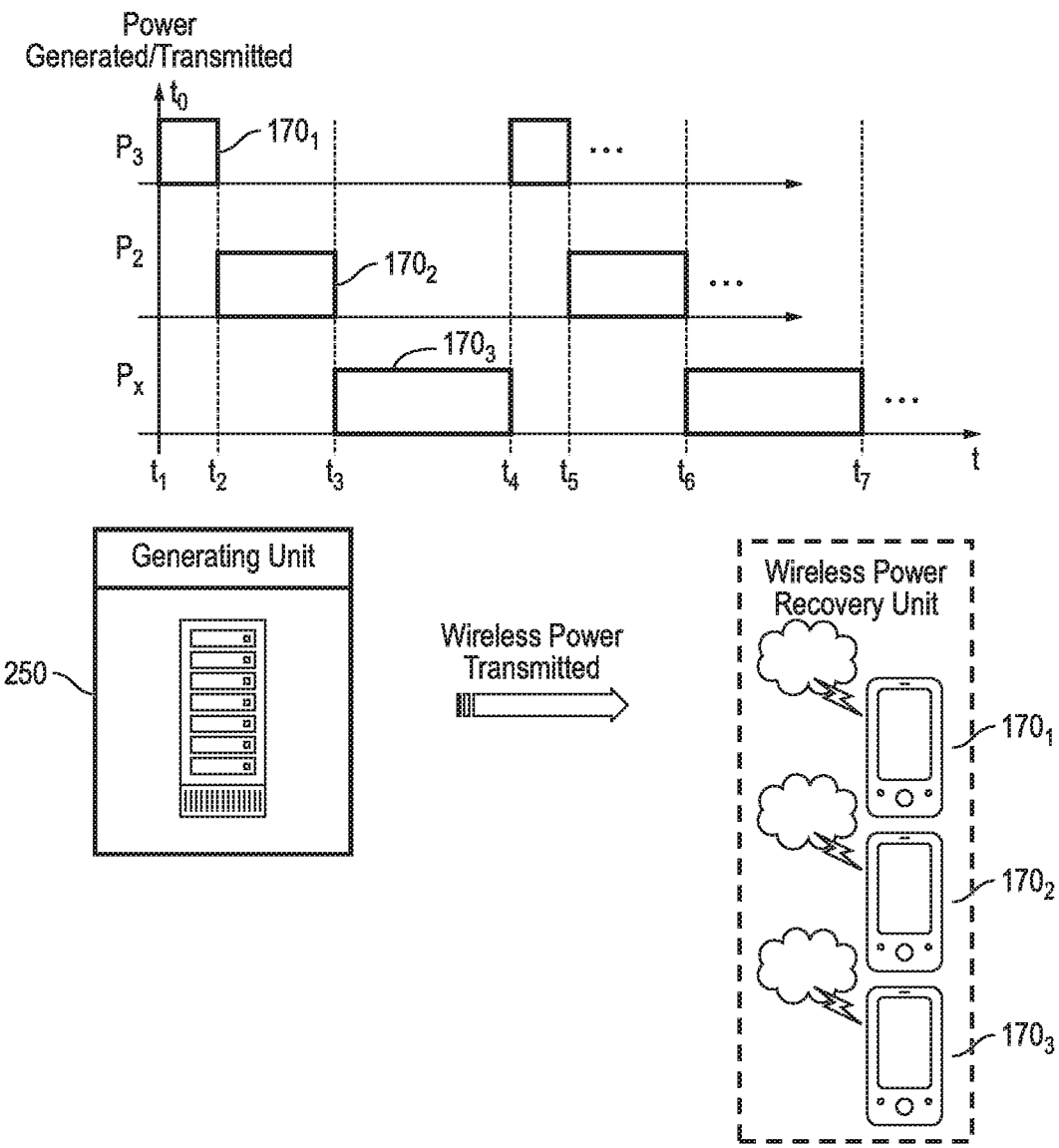
FIG. 5 is an exemplary time-domain multiplexed cycles used to transfer power from a generating unit to a multitude of receive units, in accordance with one exemplary embodiment of the present invention.

FIG. 4 is an exemplary timing diagram showing cycles during which power is transferred from a GU 250 to a receive unit 170. The average power delivered to the receive unit is also shown. FIG. 5 is another exemplary timing diagram showing time-domain multiplexed cycles used to transfer power from GU 250 to three different receive units $170_1$, $170_2$ and $170_3$. As shown, during the cycles defined substantially by times $(t_2-t_1)$, $(t_5-t_4)$ ... $(t_{2+3k}-t_{1+3k})$ power is transferred to the receive unit $170_1$, where k is an integer. During the cycles defined substantially by times $(t_3-t_2)$, $(t_6-t_5)$ ...) ... $(t_{3+3k}-t_{2+3k})$ power is transferred to the receive unit 1702. During the cycles defined substantially by times $(t_4-t_3)$, $(t_7-t_6)$ ...) ... $(t_{4+3k}-t_{3+3k})$ power is transferred to the receive unit $170_3$. Although not shown explicitly in FIG. 5, it is understood that power can be transferred to more than one device concurrently during any of the timing cycles. In one example, GU 250 may correspond to generating unit 100 of FIG. 1 or generating unit 200 of FIG. 2.

Figure 6A:
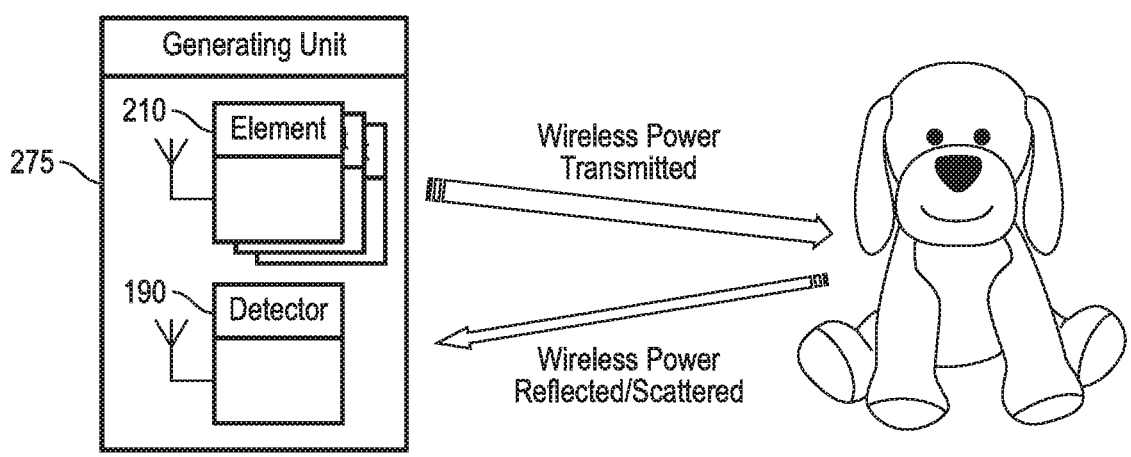
FIG. 6A shows a generating units having disposed therein a multitude of generating elements and a receiver, in accordance with one embodiment of the present invention.
Figure 6B:
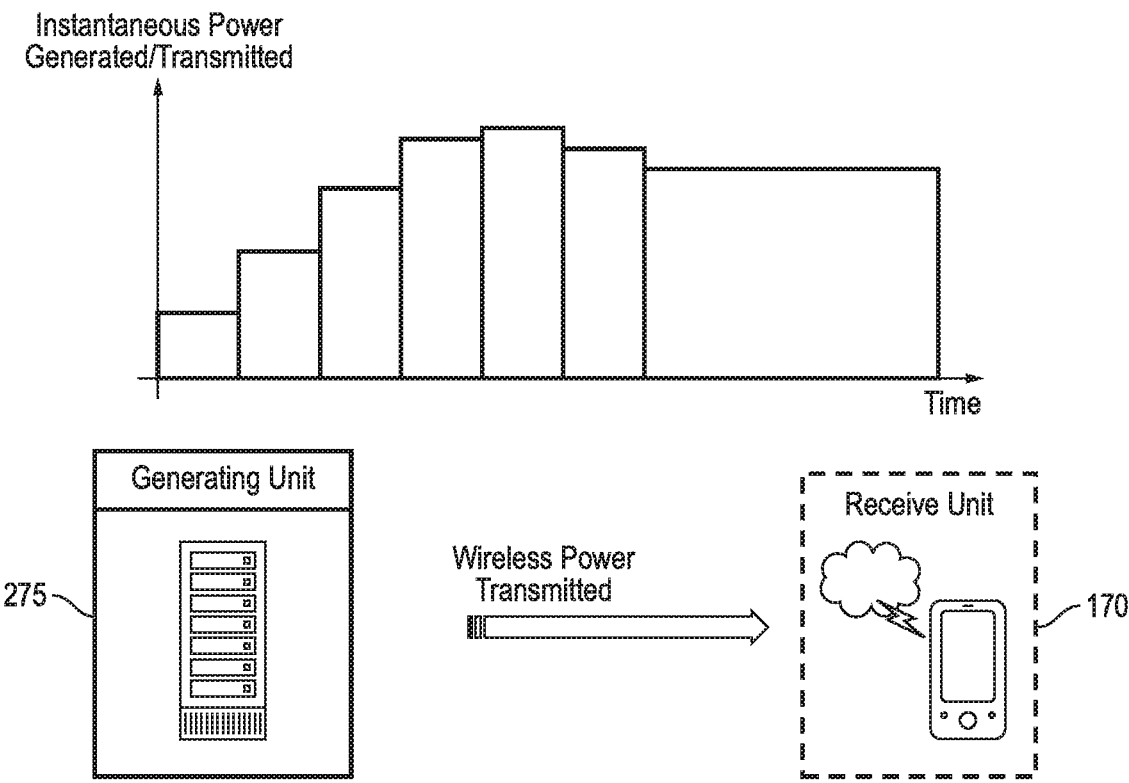
FIG. 6B shows exemplary changes in the instantaneous power generated by a generating unit in response to the detection of, a human, a pet, other environmental changes, or conditions, in accordance with one embodiment of the present invention.

FIG. 6A shows a GU 275 having disposed therein a number of generating elements 210 and a detector 190. In accordance with embodiments of the present invention, when detector 190 detects movement or senses a change in the amount of power it is detecting, it can adjust the amount of power that its associated generating elements generate. Detector 190 is further adapted to detect the presence of a human or a pet, in part, in response to their heart beat rate. Accordingly, a wireless power generation unit, in accordance with embodiments of the present invention, is aware of the environment in which it is operating. For example, in FIG. 6A, generating unit 275 is assumed to have detected the presence of a live being (a dog in FIG. 6A) in its transmission path. In response to the detection, the generating unit may either turn off or lower the power of the RF signal it transmits or respond in other pre-determined and possibly user-customizable ways. Once the generating unit detects that the dog has moved out of the signal path, it increases its output power. FIG. 6B shows exemplary changes in the instantaneous power generated by GU 2750 in response to the detection of, a human, a pet or other environmental changes.

Controlling the power delivered via duty-cycling to steer the RF signal to the receive unit(s) provides a number of advantages. First, it causes the GU(s) to operate at near optimum efficiency at instantaneous full output power. Second, since the power received by the receive units is maximized during the power delivery cycles, requirements on the sensitivity of the receive unit(s) is relaxed. Furthermore, the power amplifier disposed in the output stage of each generating element is caused to possibly operate under less voltage, current and temperature stresses. Output power generation efficiency is also typically improved at relatively high instantaneous output power. When using time-domain multiplexing to transfer power, the total time usable for adaptively controlling the GU is decreased by the duty-cycles. However, since any movement by the receive unit is often relatively slow, the relatively slower adaptive feedback control is sufficient. Furthermore, since the duty-cycled transmitted power includes the duty-cycle information, the receive unit(s) is aware of the duty-cycle and can correctly inform the generating unit of the amount of power the receiving unit(s) is receiving.

In accordance with one aspect of the present invention, the generated/transmitted power is changed directly via an output power control technique in each generation element. Controlling the output power of each generation element individually enhances the precision of focusing the transmitted power to a point or multiple points in space. Furthermore, compared to the time-domain multiplexing, faster adaptive feedback control of the generation unit(s) is achieved.

Figure 7:
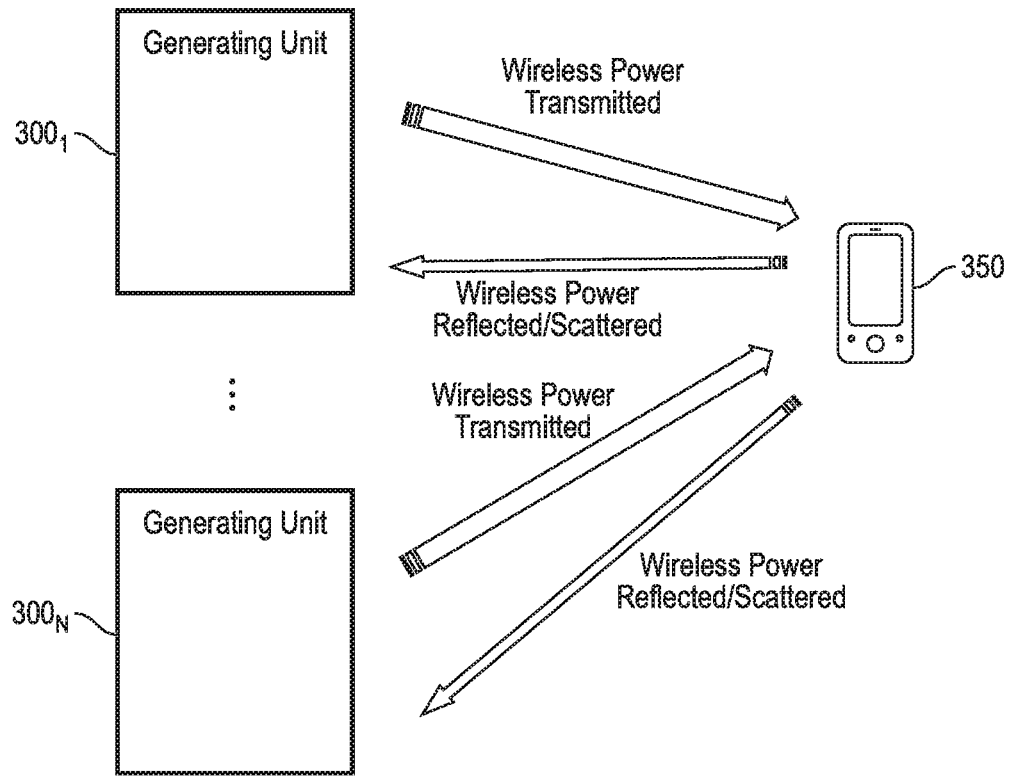
FIG. 7 is a schematic diagram of a pair of generating units operating cooperatively to deliver power wirelessly, in accordance with one embodiment of the present invention.

FIG. 7 is shows a multitude of generating units $300_1$ ... $300_N$ that operate in concert to optimize power delivery to a receive device 350, in accordance with another embodiment of the present invention. Each generating unit includes, in part, a control unit, a receiver, and a multitude of generating elements, as shown for example in FIGS. 1 and 2. The generating units may be mounted in different physical locations. For example, generating unit $300_1$ may be mounted on a ceiling, generating unit 3002 may be mounted on an adjacent wall of a room, whereas other generating units may be mounted in different rooms or locations.

In accordance with one aspect of the present invention, the control units disposed in the generating units cooperate and implement a protocol to optimize the power delivery to a receive unit 350. To achieve this, in accordance with one aspect of the present invention, the generating units establish a communication link and vary the amount of power they generate until the power efficiency they collectively deliver to receive unit 350 reaches a maximum. Furthermore, as the receive device moves from one location to another, a hand-off protocol governing the operations of generating units, may select one or more other generating units that are best positioned to power the receive device at its new location. For example, while the protocol may select a first subset of $GU_s$ 300 to power the receive device at its first position, as the receive device moves to another location, the protocol may select a second subset of $GU_s$ 300 to power the receive device. In accordance with yet another aspect, the control units disposed in the generating units establish a communications links to synchronize the reference timing signals that they use to change the phases of the RF signals they transmit, thereby maximizing the power transfer efficiency to the receive unit.

Figure 8:
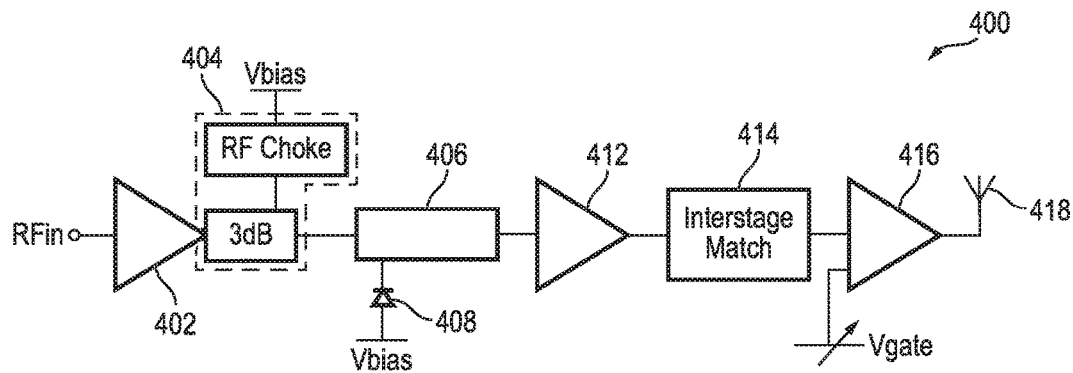
FIG. 8 is a schematic block diagram of a generating element, in accordance with one exemplary embodiment of the present invention.

FIG. 8 is a schematic block diagram of a generating element 400, in accordance with one exemplary embodiment of the present invention. Generating element 400 may correspond to generating elements 110 shown in FIG. 1, or generating elements 210 shown in FIG. 2. Generating element 400 is shown as including, in part, amplifiers 402, 412, 416, RF choke/3 dB attenuator block 404, transmission line 406, diode 408 and interstage matching circuit 414. Amplifier 402 amplifies the input RF signal RFin. RF choke/3 dB attenuator block 404 prevents the output signal of amplifier 402 from flowing into the bias voltage $V_{bias}$ and reduces performance variations of amplifier 402 due to impedance mismatch In one example, transmission line 406 has an impedance of 70 ohms and a round-trip delay of 54°. Transmission line 406 increases the control over the phase shift of the output signal of amplifier 402. The capacitance of the reverse-biased diode 408 is also used to control the phase delay of the RF signal. By varying the supply voltage $V_{bias}$, the capacitance of the reverse-biased diode 408 and hence the phase delay of the RF signal may be varied. Accordingly, transmission line 406 together with diode 408 generate the required amount of the phase delay in the RF signal delivered to amplifier 412. In some embodiments, an inductive element may be used in place of diode 408 to vary the phase of the RF signal.

Amplifiers 402 and 412 collectively maintain the gain of the RF signal substantially independent of the phase introduced by the transmission gate 406, and diode 408. Interstage match 414 matches the impedance seen at the output of amplifier 412 to the impedance seen at the input of power amplifier 416. By varying the voltage supplied by variable voltage supply Vgate, the amplitude and hence the power of the RF signal transmitted by amplifier 416 may be varied. Accordingly, generating element 400 is adapted to vary both the amplitude and phase of the RF signal it transmits.

In accordance with one aspect of the present invention, a generation element includes an RF detector used to detect the output voltage generated by a generation element and scattered by the surrounding objects as well as the voltage generated by any RF signal incident on an antenna coupled to the generation element. During power transmission, this functionality allows for monitoring the phase and the amplitude of the generated signal. In the absence of power transmission, power signals transmitted by other generation elements or their reflections off obstacles, humans or pets can be detected to allow for environmental awareness of the system. For example, maximum output power can be limited if, for example, humans or pets are detected.

The ability to detect the generated/transmitted output power and/or power reflected back by objects and/or living organisms has a number of advantages, particularly for providing an adaptive or smart solution. For example, transitory or stationary obstacles in the physical environment can be detected to adjust the operation of the GU(s). Moreover, detecting the presence of living organisms allows for adjustment and control of the generated/transmitted power to improve overall power transmission efficiency and/or respond to user preferences. Reflections are typically periodic with an organism's heartbeat, breathing and/or movement, among other factors, and can, for example, be detected by detecting a Doppler Shift in the reflected signal.

Figure 9:
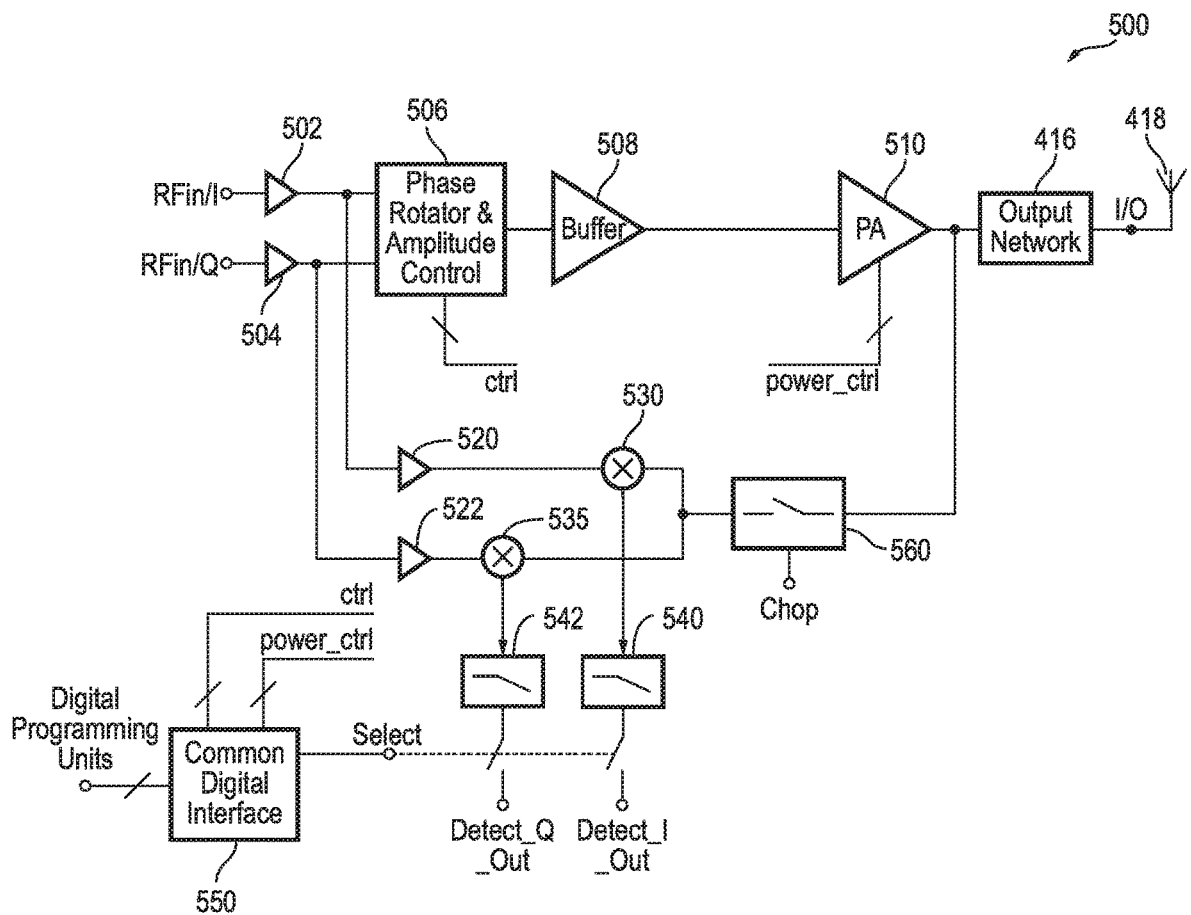
FIG. 9 is a schematic block diagram of a generating element, in accordance with one exemplary embodiment of the present invention.

FIG. 9 is a schematic block diagram of a generating element 500, in accordance with another exemplary embodiment of the present invention. Generating element 500 may correspond to generating elements 110 shown in FIG. 1, generating elements 210 shown in FIG. 2 or generating element 710 in FIG. 12. The in-phase and quadrature-phase components of the input RF signal, namely signals RF_in/I and RF_in/Q are buffered respectively by buffers 502, 504 and applied to phase rotator and amplitude control block 506, which in turn, changes the phase and/or the amplitude of the received signals in response to signal Ctrl generated by common digital interface block 550 using, for example, Cartesian addition. The output signal of phase rotator and amplitude control block 506 is buffered by buffer 508, amplified by power amplifier 510 and transmitted by antenna 418 via output network 512. The amplitude of the transmitted signal may also be varied by changing the biasing voltage applied to power amplifier 512 via control signal Power_Ctrl generated by common digital interface block 550.

Output network 512 is further adapted to detect the RF signal generated as a result of the scattering and reflection of the RF signal it transmits, as well as any other RF signal incident on antenna 418. The scattered signal which may be detected by turning off power amplifier 512, is received by the bidirectional input/output terminal I/O of output network 512 and delivered to chopper (chopping circuit) 560. Chopper 560 is adapted to translate the frequency of the RF signal it receives, such as, for example, by 5 MHz. Using the output signal of the chopper 560, mixer 530 frequency downcoverts the received signal using the input RF signal RF_in/I (supplied to the mixer by buffers 502, 530) and supplies the frequency downconverted signal to filter 540. Likewise, using the output signal of the chopper 560, mixer 535 downcoverts the received signal using the input RF signals RF_in/Q (supplied to the mixer by buffers 504, 532) and supplies the frequency downconverted signal to filter 542. Signals Detect_Q_out and Detect_I_out supplied by filters 540, 542 are representative of the scattered RF signal received by antenna 418, and may be further amplified, converted in frequency, and/or converted to digital information, as appropriate, for example by block 760 described further below and shown in FIG. 12

Figure 10A:
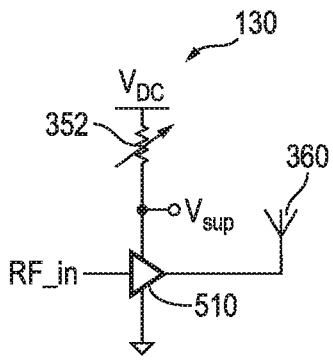
FIG. 10A is a block diagram of a power amplifier disposed in a generating element and whose power may be varied by changing the resistance of a variable resistor.
Figure 10B:
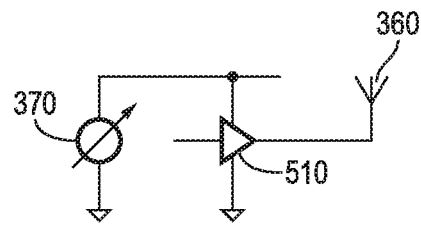
FIG. 10B is a block diagram of power amplifier disposed in a generating element and whose power may be varied by changing the supply voltage.

The output power generated by power amplifier 512 of FIG. 9 may be controlled in a number of different ways. In FIG. 10A, the amplitude and thus the power of the RF signal generated by amplifier 510 and transmitted by antenna 360 may be varied by varying the resistance of variable resistor 352. In FIG. 10B, the amplitude and thus the power of the RF signal generated by amplifier 510 and transmitted by antenna 360 may be varied by changing the voltage supplied by of variable supply voltage 370. Since the supply voltage may be shared between multiple output stages, the circuit shown in FIG. 10B is advantageous in controlling the power generated by multiple generating elements. In addition, the output power generated by amplifier 512 of FIG. 9 may be controlled by controlling the RF signal input amplitude, for example by using block 506, as described above.

Each generation element that operates in concert with another generating element to provide wireless power requires timing synchronization. Timing synchronization may be provided by the radio-frequency signals themselves, or by a separate reference timing signal distributed so as not to interfere with the RF signals generated by the generation elements. In accordance with one embodiment, a tree-like network is used to distribute a timing reference signal having a frequency that is a sub-harmonic of the RF signal, thereby enabling the use of an integer-N type PLL synthesizer to phase-lock both signals. A master reference signal is used to generate the master timing reference signal. In one embodiment, the reference signal is buffered and delivered to the first generation element as well as to $N_a$ more buffers (e.g., $N_a$=3), which in turn generate a buffered version of the signal for $N_a$ more buffers and an additional generation element. This technique is extended in a way that a buffered version of the reference signal is distributed to each generating element such that no more than n buffers are used. Distributing the reference signal in accordance with this scheme ensures that $$\frac{N_a^n - 1}{N_a - 1}$$

generation elements receive the reference signal.

In accordance with another embodiment, the reference timing signal may not be an exact sub-harmonic of the RF output signal. For example, a timing reference signal at any lower frequency than the RF output signal can be used by employing a fractional-N phase-locked loop synthesizer. A timing reference signal at substantially exactly the same as the reference frequency may be employed using injection locking. A timing reference signal at a frequency higher than the RF frequency may be divided in frequency, either using an integer-N or a fractional-N divider.

Figure 11:
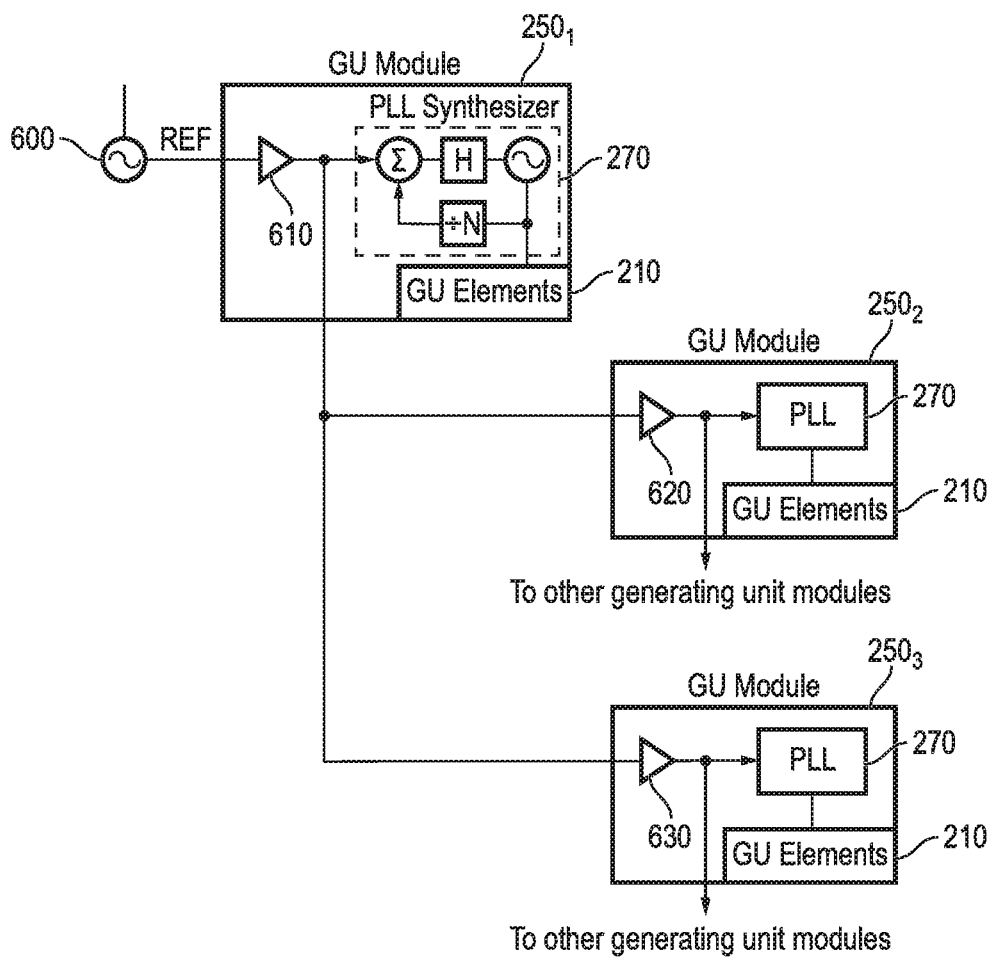
FIG. 11 shows an exemplary distribution network distributing reference timing signals to a multitude of generating unit modules disposed in a generating unit, in accordance with one exemplary embodiment of the present invention.

FIG. 11 shows a reference timing signal generating 600 supplying the reference timing signal REF to generating unit module 250₁ via buffer 610. Generating unit module 250₁ is shown as including a phase-locked loop (PLL) synthesizer 270 and a multitude of generating elements collectively identified as 210. The output signal of buffer 610 is further buffered by buffers 620 and 630 and supplied to PLL's 270 disposed in generating unit modules 250₂ and 250₃ respectively. The reference timing signals supplied by buffers 620, 630 are applied to other generating unit modules (not shown).

Each copy of the reference timing signal may be used to generate an RF signal for a single or a multitude of generating elements, thus allowing for a modular approach in forming a generating unit. For example, each generating element may have a dedicated phase-locked loop synthesizer to generate an RF signal whose amplitude and/or delay is controlled independently, as described above. Alternatively, a multitude of generating elements may use an RF signal generated by the same phase-locked loop synthesizer, as described above with reference to FIG. 12.

Figure 12:
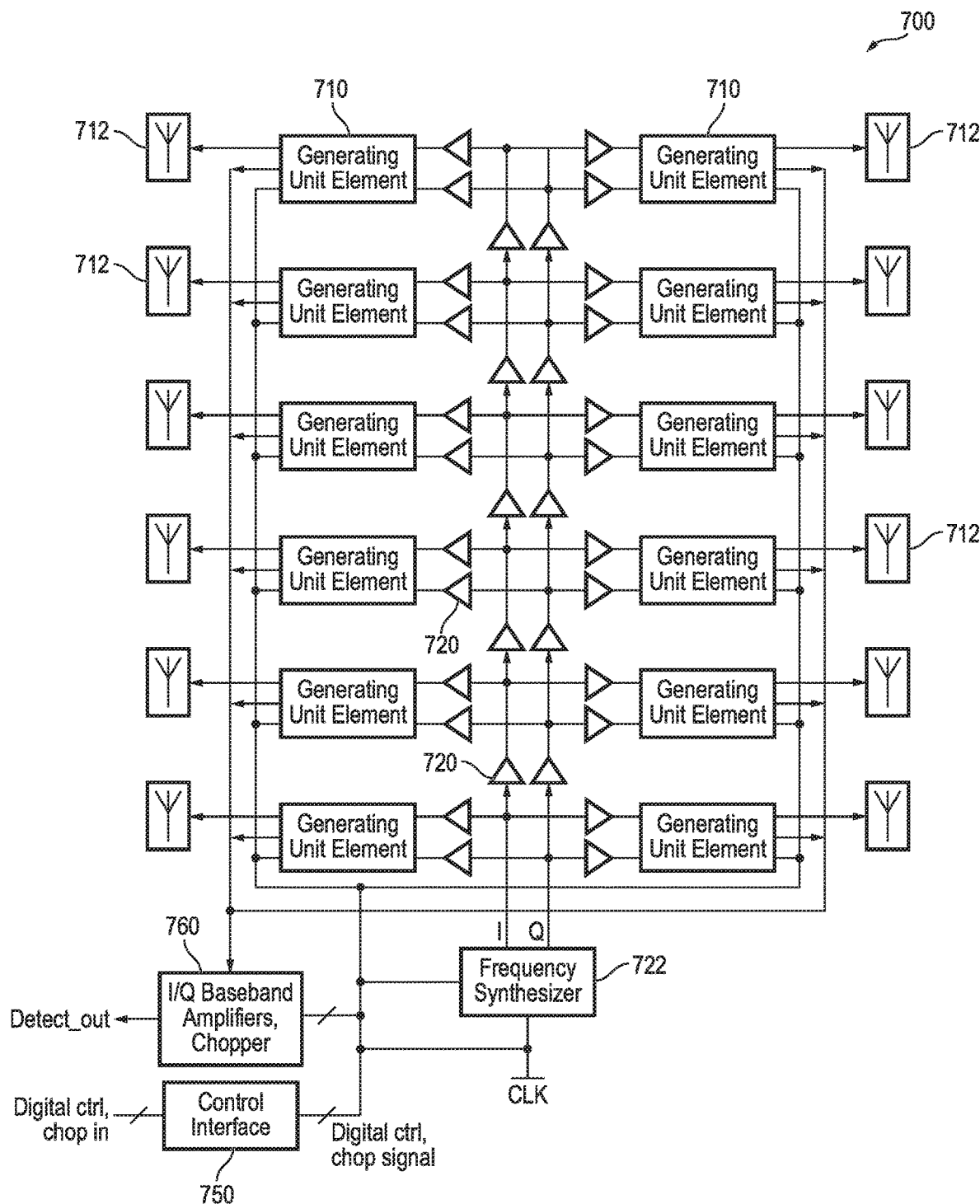
FIG. 12 is a block diagram of a generation unit module adapted to wirelessly transfer power to a receive unit via RF electro-magnetic waves, in accordance with another exemplary embodiment of the present invention.

FIG. 12 is a block diagram of a generating unit module 700, in accordance with another exemplary embodiment of the present invention. Exemplary generating unit module 700 is shown as including, in part, 12 generating elements 710 each coupled to an associated antenna 712. Frequency synthesizer 722, which may be a PLL, receives the reference timing signal CLK and, in response, generates in-phase (I) and quadrature-phase (Q) components of the RF signal that are applied to the generating elements 710 via buffers 720. Shared control interface 750 generates the control signals used by the generating elements 710. For example, and as described above, control interface 750 generates the control signals that change the phase and/or amplitude of the RF signal transmitted by each of the antennas 712 to optimize the wireless power delivery. Block 760 is adapted to select a pair of in-phase and quadrature-phase signals from among the multitude of pair of signals Detect_Q_out, Dectect_I_out detected by generating unit elements 700 (see FIG. 5), amplify and/or perform additional signal processing (e.g., chopping) on the selected in-phase and quadrature-phase signals, and deliver the result of its various operations as an output signal Detect_out. In one embodiment, with the exception of the antennas, all components of generating unit 700 shown in FIG. 12 are formed on an integrated circuit (IC).

As described above, a generation unit may include one or multiple generating unit modules each including, in turn, one or more generation elements, thereby enabling the generating unit to be formed in a modular fashion. The generating unit modules may share a number of components such as the timing reference components, voltage and/or current reference components, and/or frequency generation components in order to reduce cost, overhead and complexity of the overall generation unit. The modular approach provides a number of advantages, such as cost savings due to economies of scale, the ability to use the same modules for units usable in different applications, upgradability, and the like. Consequently, in accordance with embodiments of the present invention, any number of generation elements and/or generating unit modules may be combined in a modular fashion to form a scalable generation unit or system.

The higher the number of generation elements and/or generation unit modules in a generation unit, the higher is the power transfer localization and overall efficiency. The number of generating elements and/or generating unit modules may be determined, in part, by the device intended to be charged, the requirements for system efficiency, transfer range and accuracy. For example, providing power wirelessly to a wireless mouse may have lower requirements on efficiency, range, accuracy and power, and hence would require a relatively fewer number of generating elements and/or generating unit modules than would a tablet computer.

A GU, in accordance with embodiments of the present invention, may be formed in a planar arrangement and mounted on the walls and/or ceiling of a room, or placed in any other convenient fashion, to power a receive unit positioned nearly anywhere inside the room. Furthermore, the generation elements, as well as generation unit modules may be configured to form an array of generation units in much the same way that individual antennas may be configured to form an antenna array. For example, a two-dimensional planar arrangements of generation elements and/or generation unit modules may be configured to form a low form-factor generation units suitable for placement on the walls, ceiling or floors. Three dimensional arrangements of generation elements and/or generation unit modules may form a spherical or other geometrical shapes that are aesthetically pleasing. The scalability and modularity of the embodiments of the present invention thus provide numerous advantages.

Figure 13A:
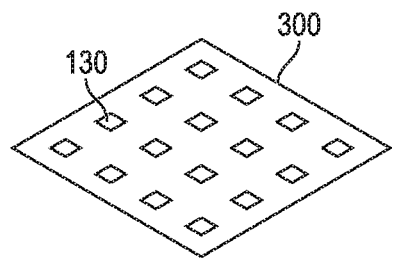
FIGS. 13A-13D show a number of different configurations by which a multitude of generating elements may be arranged to form a generating unit, in accordance with some exemplary embodiment of the present invention.
Figure 13B:
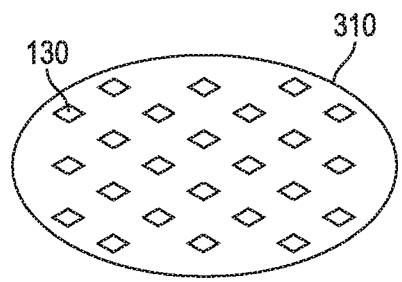
Figure 13C:
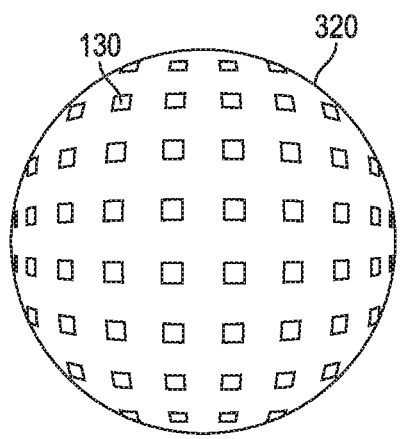
Figure 13D:
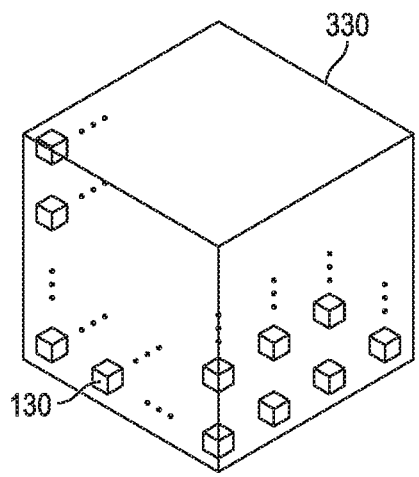

FIGS. 13A-13D show a number of different configurations by which the generating elements, such generating elements 130 of FIGS. 1 and 2, may be arranged to form a generating unit. In FIG. 13A, generating elements 130 are arranged to form a rectangular generating unit 300. In FIG. 13B, the generating elements 130 are arranged to form a circular generating unit 310. In FIG. 13C, generating elements 130 are arranged to form a spherical generating unit 320. In FIG. 13D, generating elements 130 are arranged to form a cubical generating unit 330.

The above embodiments of the present invention are illustrative and not limitative. Embodiments of the present invention are not limited by any RF frequency or any type of antenna, such as dipole, loop, patch, horn or otherwise, used to transmit the RF signal. Embodiments of the present invention are not limited by the number of generating elements, generating unit modules, or generating units. Embodiments of the present invention are not limited by the polarization direction, such as linear, circular, elliptical or otherwise, of the RF signals transmitted by the antennas. Furthermore, in some embodiments, the transmitted RF signal may be of varying polarization. While, in accordance with some embodiments, discrete components and/or integrated circuits may be used to form generating units, generating unit modules or generating blocks, other embodiments may be formed using integrated circuits. Furthermore, in some embodiments, many or all control function may be performed using one or more FPGAs, microprocessors, microcontrollers, DSPs, ASICs or the like. Other additions, subtractions or modifications are obvious in view of the present disclosure and are intended to fall within the scope of the appended claims

What is claimed is:

1. An RF signal generator adapted to wirelessly transfer power to a first wireless device, said RF signal generator comprising:
a first plurality of generating elements each adapted to generate an RF signal, the plurality of the RF signals being transmitted by a first plurality of antennas;
a wireless signal receiver; and
a control unit adapted to control a phase of the RF signal generated by each of the first plurality of RF signal generating elements in accordance with a first signal the receiver receives from the first wireless device, wherein said RF signal generator is adapted to wirelessly transfer power to the first wireless device using time-domain multiplexing, and wherein an average power transferred to the first wireless device is controlled by adjusting duty cycle of the RF signals generated by the first plurality of generating elements.

2. The RF signal generator of claim 1 wherein said control unit is further adapted to control an amplitude of the RF signal generated by each of the plurality of RF signal generating elements.

3. The RF signal generator of claim 1 wherein said RF signal generator is further adapted to power a second wireless device concurrently with the first wireless device.

4. The RF signal generator of claim 1 wherein said RF generator is further adapted to power a second wireless device, said RF signal generator transferring power to the first and second wireless devices using the time-domain multiplexing.

5. The RF signal generator of claim 1 wherein said RF signal generator further comprises a second plurality of generating elements each adapted to generate an RF signal, said control unit being further adapted to cause one of the first plurality of generating elements or the second plurality of generating elements to generate RF signals during a first time period.

6. The RF signal generator of claim 1 wherein said RF signal generator further comprises a second plurality of generating elements each adapted to generate an RF signal, said first and second plurality of generating elements each adapted to generate an RF signal in accordance with a reference timing signal supplied by the control unit.

7. The RF signal generator of claim 1 wherein said RF signal generator further comprises:
a detector adapted to detect an RF signal caused by scattering or reflection of the RF signal transmitted by the first plurality of antennas.

8. The RF signal generator of claim 7 wherein said control unit is further adapted to control a phase of the RF signal generated by each of the first plurality of RF signal generating elements in accordance with the signal detected by the detector.

9. The RF signal generator of claim 8 wherein said detector is further adapted to detect presence of objects or living organisms positioned along a path of the RF signal transmitted by the first plurality of antennas.

10. The RF signal generator of claim 1 wherein said RF signal generator is integrated on a semiconductor die.

11. The RF signal generator of claim 1 wherein said RF signal generator is adapted to receive a second plurality of generating elements in a modular fashion thereby enabling the control unit to control a phase and amplitude of the RF signal generated by each of the second plurality of RF signal generating elements in accordance with the first signal the receiver receives from the first wireless device.

12. The RF signal generator of claim 1 further comprising a plurality of control locked loops adapted to provide timing signals used in varying the phases of the RF signals generated by the RF signal generating elements.

13. The RF signal generator of claim 1 further comprising a plurality of phase rotators adapted to vary the phases of the RF signals generated by the RF signal generating elements.

14. The RF signal generator of claim 6 wherein said reference timing signal is delivered to the first and second plurality of generating elements using a tree-like distribution network.

15. The RF signal generator of claim 7 wherein said control unit is further adapted to control the amplitude of the RF signal generated by each of the first plurality of RF signal generating elements in accordance with the signal detected by the detector.

16. A method of powering a first wireless device using radio frequency (RF) signals, the method comprising:
transmitting a first plurality of RF signals via a first plurality of antennas;
receiving a first signal from the first wireless device;
controlling phases of the first plurality of RF signals in accordance with the first signal;
transmitting the first plurality of RF signals using time-domain multiplexing; and
controlling an average power transferred to the first wireless device by adjusting duty cycle of the RF signals transmitted by the first plurality of antennas.

17. The method of claim 16 further comprising:
controlling amplitudes of the RF signals in accordance with the first signal.

18. The method of claim 16 further comprising:
transmitting a second plurality of RF signals to power a second wireless device concurrently with the first wireless device.

19. The method of claim 16 further comprising:
transmitting a second plurality of RF signals, wherein each of said first and second plurality of RF signals is generated in accordance with a reference timing signal supplied by a control unit.

20. The method of claim 16 further comprising:
detecting a scattered RF signal caused by scattering or reflection of the RF signal transmitted by the first plurality of antennas.

21. The method of claim 20 further comprising:
controlling a phase of the each of the first plurality of RF signals in accordance with the detected RF signal.

22. The method of claim 16 further comprising
detecting presence of objects or living organisms positioned along a path of the first plurality of RF signals.

23. The method of claim 16 further comprising:
generating the first plurality of RF signals via a first plurality of generating elements formed on a semiconductor substrate, said semiconductor substrate further comprising a receiving unit receiving the first signal from the first wireless device, said semiconductor substrate further comprising a controller controlling the phases of the first plurality of RF signals.

24. The method of claim 16 further comprising:
generating the first plurality of RF signals via a first plurality of generating elements disposed in a generating unit, said generating unit being adapted to receive a second plurality of generating elements in a modular fashion.

25. The method of claim 16 further comprising:
controlling the phases of the first plurality of RF signals in accordance with a timing signal generated by at least one control locked loops.

26. The method of claim 16 further comprising:
controlling the phases of the first plurality of RF signals using a plurality of phase rotators.

27. The method of claim 16 further comprising:
controlling the phases of the first plurality of RF signals using timing signals delivered via a tree-like distribution network.

28. The method of claim 21 further comprising:
controlling an amplitude of the each of the first plurality of RF signals in accordance with the detected RF signal.

29. The RF signal generator of claim 4 where a ratio of average power transferred to the first and second wireless devices is adjusted by the control unit.

30. The method of claim 18 further comprising:
controlling a ratio of average power transferred to the first and second wireless devices.

\* \* \* \* \*